(12) United States Patent
Murakami et al.

(10) Patent No.: US 9,154,487 B2
(45) Date of Patent: Oct. 6, 2015

(54) REGISTRATION SERVER, GATEWAY APPARATUS AND METHOD FOR PROVIDING A SECRET VALUE TO DEVICES

(75) Inventors: Shingo Murakami, Kanagawa (JP); Johan Hjelm, Tokyo (JP); Takeshi Matsumura, Tokyo (JP); Toshikane Oda, Tokyo (JP); Kenta Yasukawa, Kanagawa (JP)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 281 days.

(21) Appl. No.: 13/883,233

(22) PCT Filed: Nov. 5, 2010

(86) PCT No.: PCT/JP2010/070159
§ 371 (c)(1),
(2), (4) Date: May 2, 2013

(87) PCT Pub. No.: WO2012/060021
PCT Pub. Date: May 10, 2012

(65) Prior Publication Data
US 2013/0227660 A1    Aug. 29, 2013

(51) Int. Cl.
*H04L 29/06*    (2006.01)

(52) U.S. Cl.
CPC .............. *H04L 63/08* (2013.01); *H04L 63/062* (2013.01); *H04L 63/0807* (2013.01)

(58) Field of Classification Search
None
See application file for complete search history.

(56) References Cited

U.S. PATENT DOCUMENTS

| | | | |
|---|---|---|---|
| 7,181,530 B1* | 2/2007 | Halasz et al. | 709/238 |
| 2005/0171720 A1* | 8/2005 | Olson et al. | 702/121 |
| 2008/0219230 A1* | 9/2008 | Lee et al. | 370/338 |

FOREIGN PATENT DOCUMENTS

| | | |
|---|---|---|
| EP | 1 633 108 A1 | 3/2006 |
| JP | 2003-338814 A | 11/2003 |
| WO | 2010092764 A1 | 8/2010 |

OTHER PUBLICATIONS

Perez, 802.11i (How we got here and where are we headed), SANS Institute, 2004.*
Lehembre, Wi-Fi security—WEP, WPA and WPA2, 2005.*

* cited by examiner

*Primary Examiner* — Minh Dinh
(74) *Attorney, Agent, or Firm* — Rothwell, Figg, Ernst & Manbeck, P.C.

(57) ABSTRACT

The present invention relates to auto-provisioning of authentication data for client devices. A registration server includes a gateway determination unit, which is configured to determine a gateway apparatus transferring a request signal from a device, and a processing unit. The processing unit is configured to transmit a first signal including a token and first access information of the gateway apparatus to the device if an identifier of the gateway apparatus is stored on the server, and to transmit a second signal indicating a positive response to the gateway apparatus when it obtains the token and the identifier based on a third signal received in response to the first signal. The gateway apparatus sends the secret value to the device when it receives the second signal.

15 Claims, 7 Drawing Sheets

REGISTRATION SERVER, GATEWAY APPARATUS AND METHOD FOR PROVIDING A SECRET VALUE TO DEVICES

CROSS REFERENCE TO RELATED APPLICATION(S)

This application is a 35 U.S.C. § 371 National Phase Entry Application from PCT/JP2010/070159, filed Nov. 5, 2010, designating the United States, the disclosure of which is incorporated herein in its entirety by reference.

TECHNICAL FIELD

The present invention relates to auto-provisioning of authentication data for client devices.

BACKGROUND

In current client-server systems, servers cannot reach clients and transmit data to them whenever new data is available. In other words, a client must send a request message to a server to fetch new data. To solve this problem, the introduction of a connectivity server is proposed on the following website, https://labs.ericsson.com/apis/web-connectivity/

FIG. 7 shows a system including such a connectivity server 106 connected to a public network 107, such as the Internet. In the system, terminal devices 101 and 105, and a home gateway 102 are client devices of the connectivity server 106. Further, the home gateway 102 may have one or more control interfaces for electric devices, such as a digital versatile disc (DVD) recorder 103 and a television (TV) receiver 104. In FIG. 7, the home gateway 102, a terminal device 101, the DVD recorder 103 and the TV receiver 104 are placed in a home 200 of a user.

The connectivity server 106 maintains a connection to a client device after authenticating the client device by an identifier and a password assigned to the client device or the user. After establishing connections between the connectivity server 106 and client devices 101, 102 and 105, terminal devices 101 and 105 as well as the home gateway 102 can freely transmit data via the connectivity server 106. For example, a terminal device 105 can send control information of the DVD recorder 103 to the home gateway 102, which the home gateway 102 outputs to the DVD recorder 103. The home gateway 102 can also upload the status of the DVD recorder 103 and/or TV receiver 104 to the terminal device 105. The user can monitor status information regarding each electric device in the home 200 from any client device via the connectivity server 106. As described above, the connectivity server 106 provides a connectivity service to client devices.

The connectivity server 106 requires authentication of client devices. In other words, the user of the client device must remember the combination of an identifier and a secret value, such as a password, and input the combination to establish a connection with the connectivity server 106. The identifier and the associated secret value are normally generated off-line.

It is convenient if the identifier and the associated secret value can be automatically generated and stored on each client device of the connectivity server 106.

SUMMARY

The present invention has been made in view of the above described problem, and it is therefore an object of the present invention to provide a method for providing a secret value to a client device. Further, it is an object of the present invention to provide a registration server and a gateway apparatus used in the method.

In accordance with a first aspect of the present invention, a registration server includes a storage unit, a gateway determination unit, a token generating unit and a processing unit. The storage unit is configured to store access information and an identifier for a gateway apparatus, the gateway determination unit is configured to determine a first gateway apparatus that transfers a request signal from a device upon receipt of the request signal. The token generating unit is configured to generate a token, and the processing unit is configured to transmit a first signal including the token and first access information of the first gateway apparatus to the device if a first identifier of the first gateway apparatus is stored in the storage unit. Further the processing unit is configured to transmit a second signal indicating a positive response to the first gateway apparatus when it obtains the token and the first identifier based on a third signal received in response to the first signal.

In accordance with a second aspect of the present invention, a gateway apparatus includes a first interface for connecting to a first network, a second interface for connecting to a second network, a storage unit, a transfer unit, an address converting unit and a processing unit. The storage unit is configured to store a first secret value, the transferring unit is configured to transfer a signal between the first network and the second network, and the address converting unit is configured to convert a source address of the signal transferred from the second network to the first network to an address assigned to the first interface. The processing unit is configured to transmit a first signal including a token to a registration server connected to the first network when it receives the token from a device connected to the second network, and to send a second secret value generated based on the first secret value to the device when it receives a second signal indicating a positive response from the registration server in response to the first signal.

In accordance with a third aspect of the present invention, a method for providing a device with a secret value includes the steps of generating a token, sending a first signal, sending a positive response, and sending a secret value. In the token generating step, a registration server generates the token upon receipt of a request signal from the device via a gateway apparatus if the registration server has an identifier of the gateway apparatus. In the first signal sending step, the first signal including the token and access information of the gateway apparatus is sent to the device from the registration server. In the positive response sending step, the positive response signal is sent to the gateway apparatus from the registration server if the registration server obtains the token and the identifier in response to the first signal. In the secret value sending step, the secret value is generated from another secret value that is assigned for the gateway apparatus when it receives the positive response signal, and sends the secret value to the device.

In accordance with a fourth aspect of the present invention, a computer program stored in a computer readable medium causes a computer to function as the registration server.

In accordance with a fifth aspect of the present invention, a computer program stored in a computer readable medium causes a computer to function as the gateway apparatus.

Further objects and advantages of the present invention will be apparent from the following description of the preferred embodiments of the invention as illustrated in the accompanying drawings.

DETAILED DESCRIPTION

Figure 1:
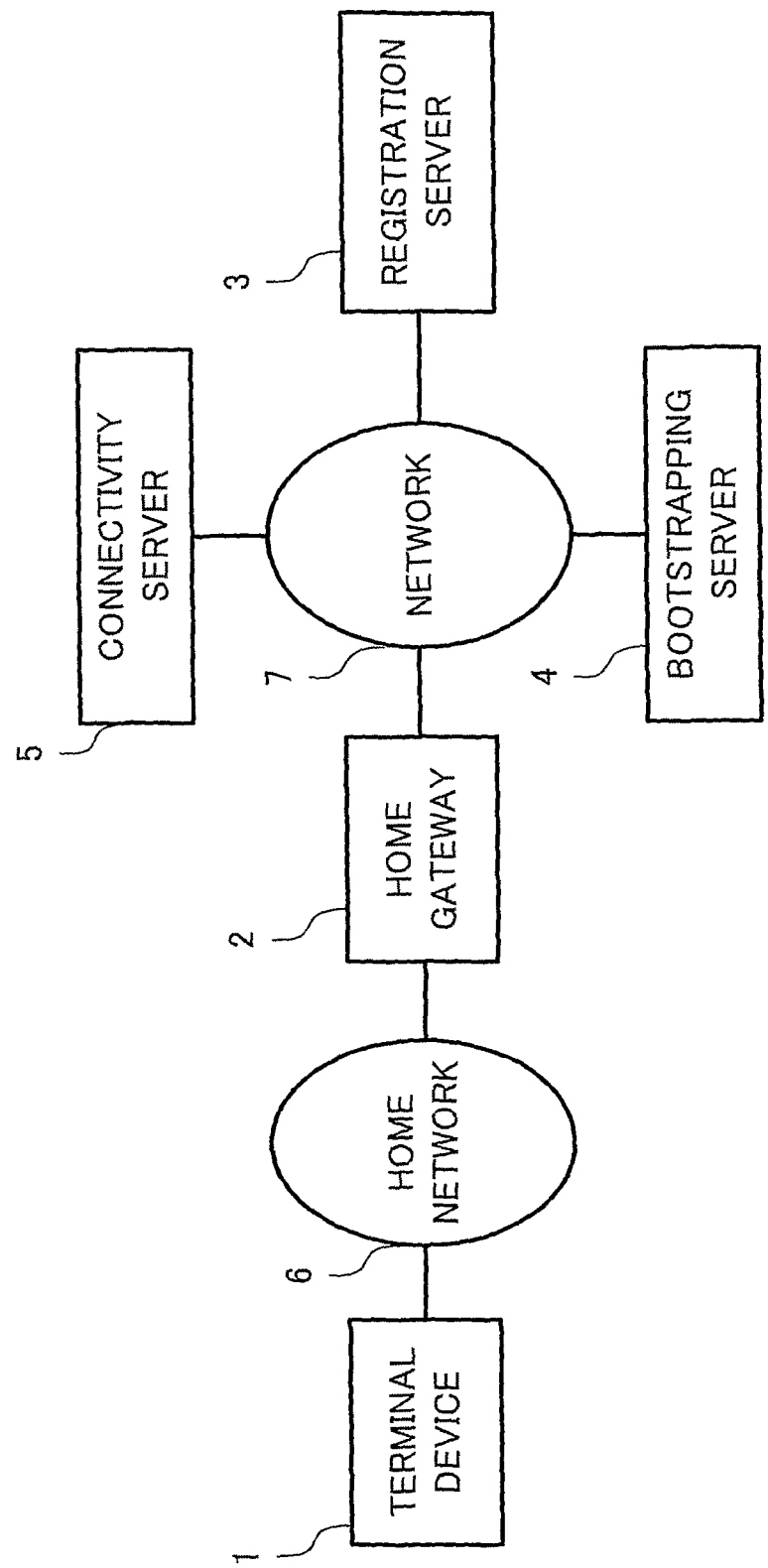
FIG. 1 shows a system according to the invention.

FIG. 1 shows an exemplary embodiment of a system according to the invention. As shown in FIG. 1, a home gateway 2, a registration server 3, a connectivity server 5 and a bootstrapping server 4 are connected to a network 7, such as the Internet. A terminal device 1 and the home gateway 2 are connected to a home network 6 in a home of a user. For example, the home network 2 is a wire-line local area network (LAN) or wireless LAN.

In FIG. 1, only one home gateway is indicated for simplification. But a plurality of home gateways, each of which is connected to a home network, are connected to the network 7. The connectivity server 5 provides the connectivity service to client devices after authenticating the client devices.

In the system, addresses used in the home network 6 and the network 7 are independent. For example, the network 7 uses so-called "public address" of the Internet, while the home network 6 uses so-called "private address." Thus, the home gateway 2 provides a network address port translation (NAPT) function.

Figure 2:
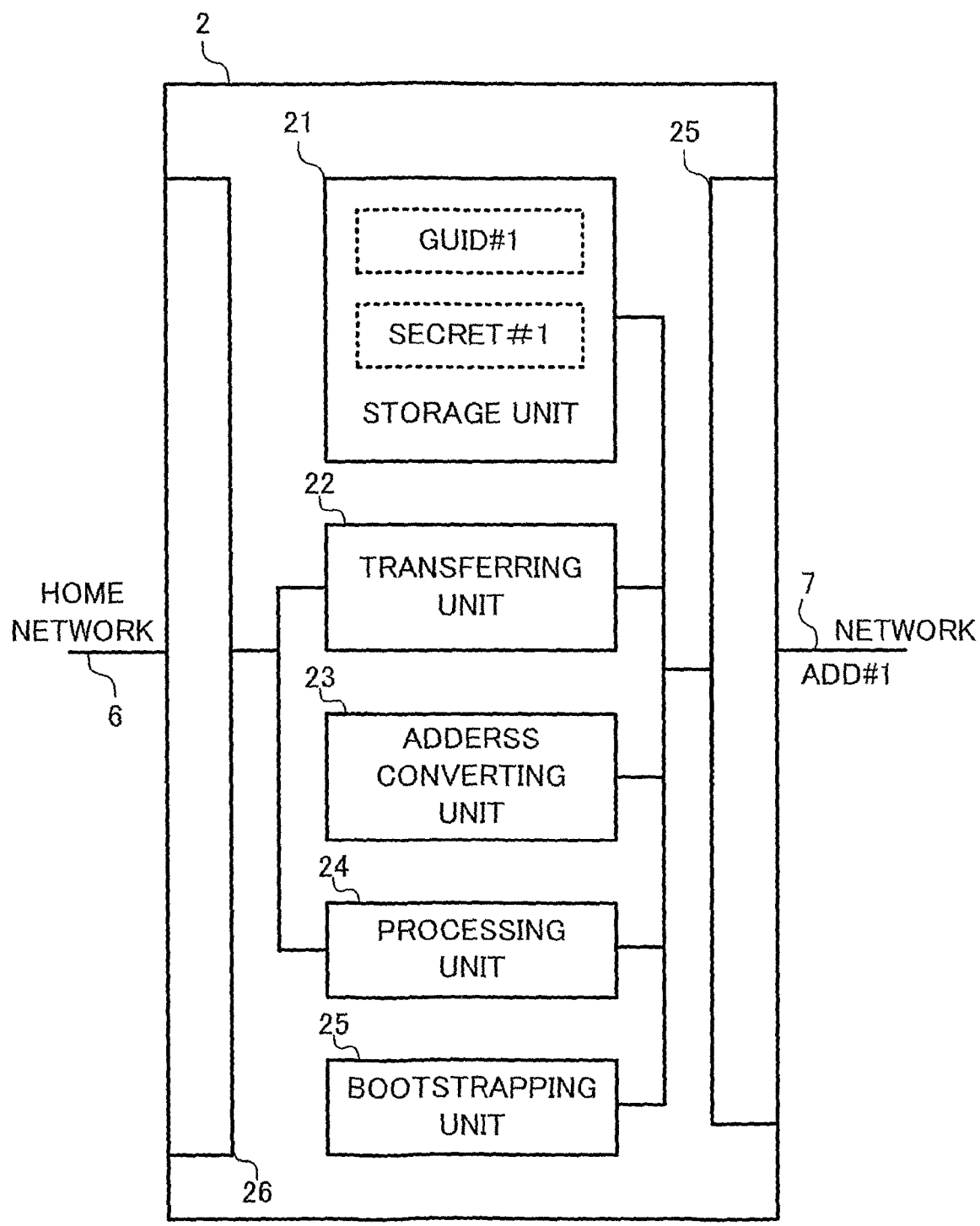
FIG. 2 is a block diagram of a home gateway.

As shown in FIG. 2, the home gateway 2 has an interface 25 for connecting to the network 7 and an interface 26 for connecting to the home network 6. An address is assigned for each interface. As shown in FIG. 2, ADD#1 is assigned to the interface 25.

A storage unit 21 stores an identifier and a secret value of the home gateway 2, which are used for authentication of the home gateway 2 by the connectivity server 5. In FIG. 2, GUID#1 is assigned as the identifier and SECRET#1 is assigned as the secret value of the home gateway 2. An exemplary embodiment of the storage unit 21 is a non-volatile memory, hard-disc drive or the like.

A transferring unit 22 is arranged to transfer a signal between the network 7 and the home network 6. When the interface 26 receives a signal destined for an apparatus on the network 7, the transferring unit 22 outputs the signal to the interface 25. Similarly, when the interface 25 receives a signal destined for an apparatus on the home network 6, the transferring unit 22 outputs the signal to the interface 26.

An address converting unit 23 is arranged to provide the NAPT function. That is, the address converting unit 23 converts a source address of a signal or a packet from the home network 6 to the address ADD#1, if the signal or the packet is destined for an apparatus on the network 7.

A bootstrapping unit 25 performs a bootstrapping process with the bootstrapping server 4 on the network 7 in order to obtain a key shared by the registration server 3. For example, the bootstrapping process performed by the bootstrapping unit 25 is in accordance with the Generic Bootstrapping Architecture (GBA) specified by the Third Generation Partnership Project (3GPP). However, it is possible to use other protocols for sharing a secret key between two apparatuses.

The home gateway 2 also includes a processing unit 24, the function of which is described later.

Figure 3:
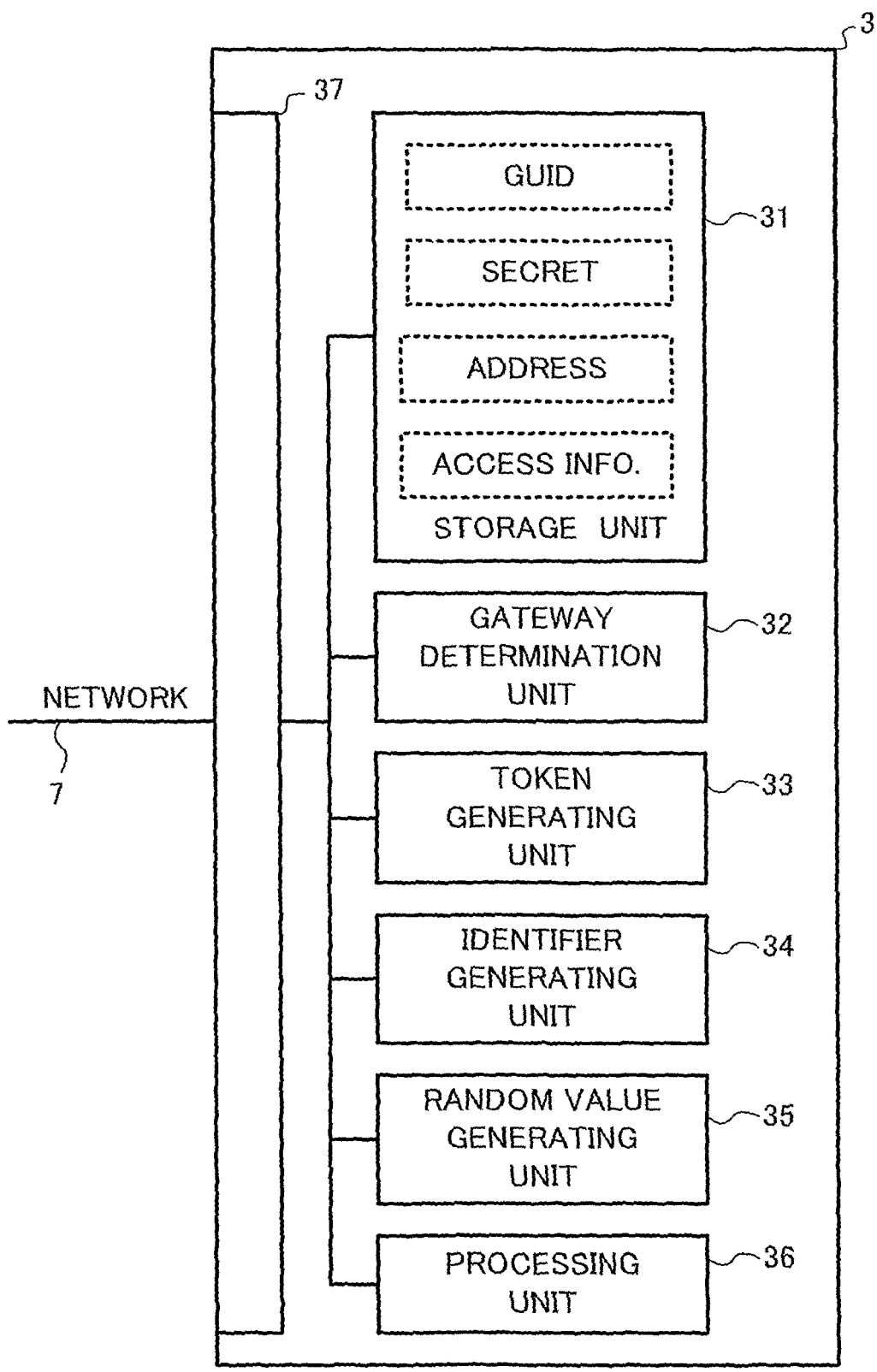
FIG. 3 is a block diagram of a registration server.

FIG. 3 is a block diagram of the registration server 3. As shown in FIG. 3, the registration server 3 has an interface 37 for connecting to the network 7 which has an address used in the network 7. A storage unit 31 stores a plurality of sets of an identifier, a secret value, an address and access information. Each set is associated with a home gateway. In this embodiment, the storage unit 31 stores GUID#1, SECRET#1 and ADD#1 as the identifier, the secret value and the address for the home gateway 2. Further, the storage unit 31 stores access information of the home gateway 2. Access information of a home gateway stored in the storage unit 31 indicates how to access the home gateway from a home network side. An exemplary embodiment of the access information is a uniform resource indicator (URI).

A gateway determination unit 32 determines a home gateway based on a source address of a received signal or packet, a token generating unit 33 generates data or values called tokens, an identifier generating unit 34 generates identifiers, and a random value generating unit 35 generates random values. The registration server 3 also includes a processing unit 36, the function of which is described later.

Figure 4:
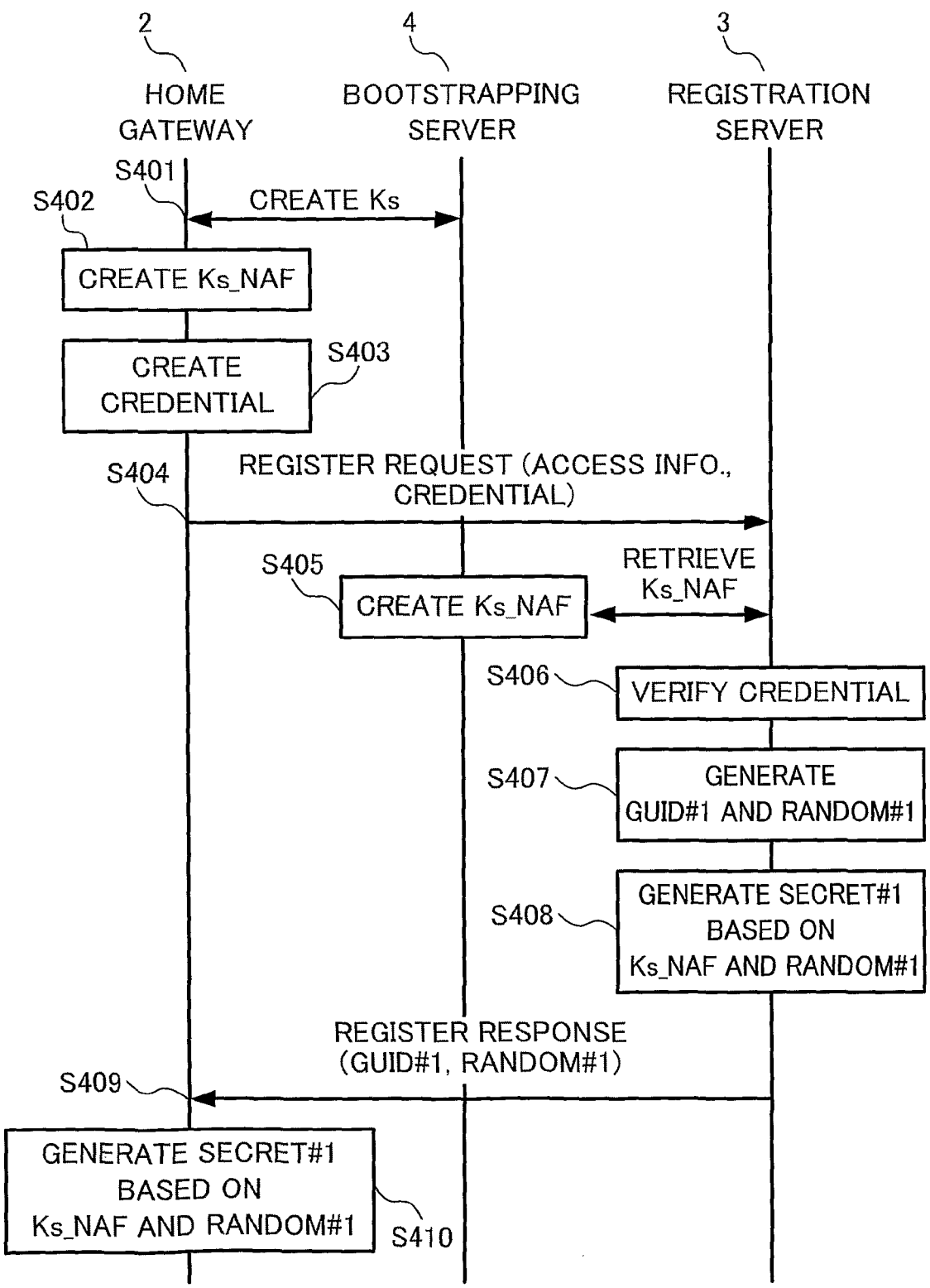
FIG. 4 is a sequence diagram for providing an identifier and a secret value with the home gateway.

FIG. 4 is a sequence diagram for providing an identifier and a secret value with the home gateway 2. The home gateway 2 obtains GUID#1 and SECRET#1, and stores them in the storage unit 21 in this sequence.

In step S401, the bootstrapping unit 25 of the home gateway 2 and the bootstrapping server 4 create a key Ks in accordance with a bootstrapping protocol, for example GBA. In step S402, the processing unit 24 of the home gateway 2 creates a secret key Ks_NAF based on the key Ks. In step S403, the processing unit 24 of the home gateway 2 creates credentials or an digital signature based on the secret key Ks_NAF, for example, from a digest of a message to be sent in step 404. It is possible to use an arbitrary method for generating credential or electrical signature based on the shred key Ks_NAF.

In step S404, the processing unit 24 of the home gateway 2 sends a register request message which includes access information of the home gateway 2 and the credential. In step S405, the processing unit 36 of the registration server 3 sends a message requiring the secret key shared with the home gateway 2, and the bootstrapping server 4 generates the secret key Ks_NAF and sends it to the registration server 3.

In step S406, the processing unit 36 of the registration server 3 authenticates the home gateway 2 by verifying the credential using the secret key Ks_NAF. If the authentication is successful, the identifier generating unit 34 and the random value generating unit 35 of the registration server 3 generate an identifier and a random value, respectively. In FIG. 4, the identifier generating unit 34 generates GUID#1 as the identifier, and the random value generating unit 35 generates RANDOM#1 as the random value.

In step S408, the processing unit 36 of the registration server 3 generates a secret value for the home gateway 2 based on the secret key Ks_NAF and RANDOM#1. In FIG. 4, SECRET#1 is generated as the secret value for the home gateway 2.

In step 409, the processing unit 36 of the registration server 3 sends a register response message including the identifier GUID#1 and the random value RANDOM#1 to the home gateway 2. In step S410, the processing unit 24 of the home gateway 2 generates the secret value SECRET#1 based on RANDOM#1 included in the register response message and the secret key Ks_NAF.

The registration server 3 stores GUID#1, SECRET#1, the access information obtained at the step S404 as well as ADD#1 included in a source address field in the register request message on the storage unit 31. Similarly, the home gateway 2 stores GUID#1 and SECRET#1 on the storage unit 21. Further, the registration server 3 sends GUID#1 and SECRET#1 to the connectivity server 5 using a secure communication technique, which is not shown in FIG. 4.

By the sequence described above, the home gateway 2 automatically obtains the identifier and the secret value, and it is possible to start communication with the connectivity server 5 by sending GUID#1 and SECRET#1.

Figure 5:
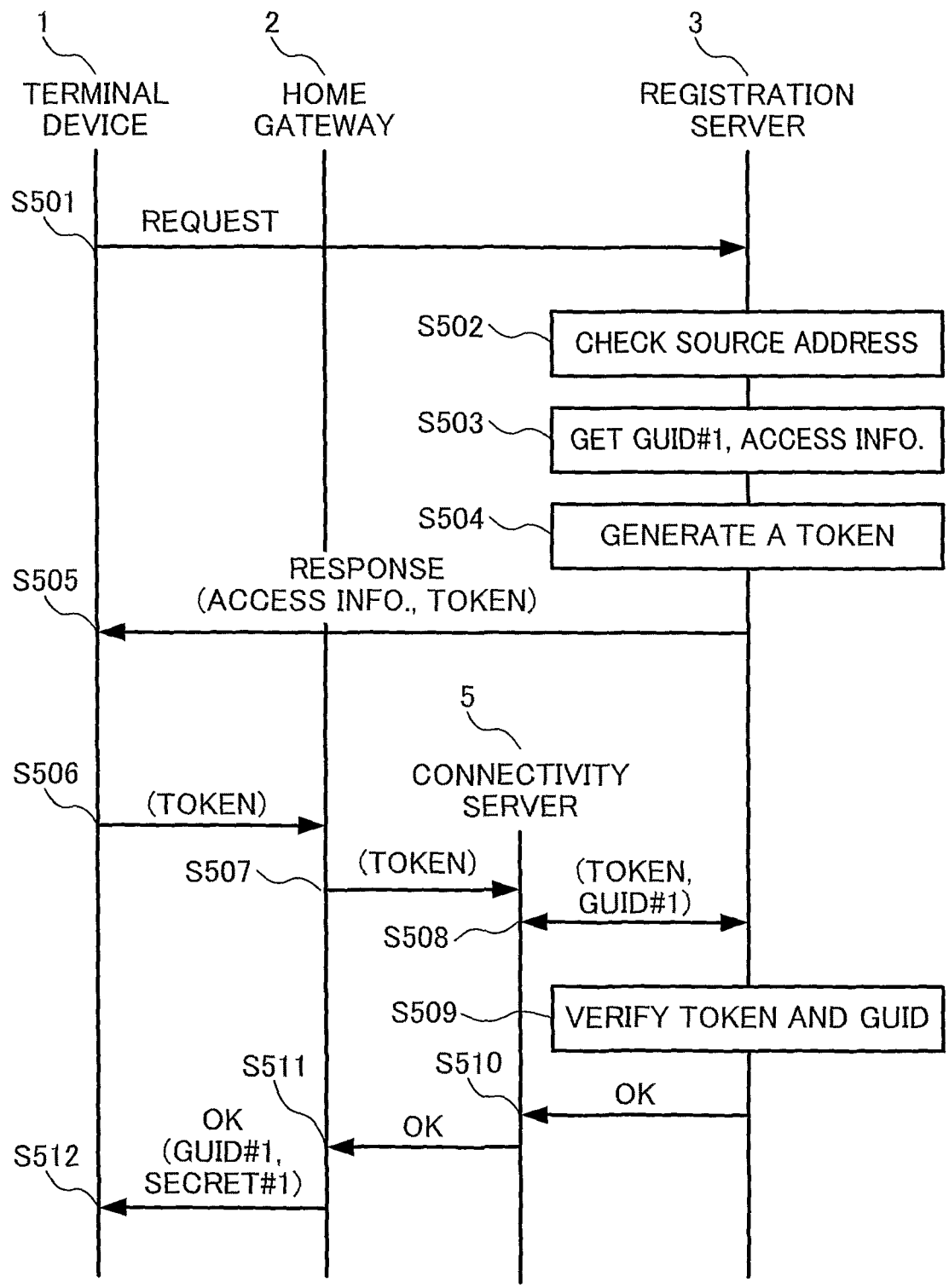
FIG. 5 is a sequence diagram for providing an identifier and a secret value with a terminal device.

FIG. 5 is a sequence diagram for providing an identifier and a secret value to the terminal device 1. Before starting the sequence, the home gateway 2 completes the sequence in FIG. 4, and obtains GUID#1 and SECRET#1. Further, the home gateway 2 establishes and maintains a connection with the connectivity server 5.

In step S501, the terminal device 1 sends a request message to the registration server 3 via the home gateway 2. The trigger for sending the request message is, for example, installation of application software, which makes use of the connectivity service provided by the connectivity server 5, on a terminal device that has no identifier and secret value used for authentication by the connectivity server 5. The access information to the registration server 3 is, for example, included in the application software.

In step S502, the gateway determination unit 32 of the registration server 3 checks a source address of the request message. Because of the NAPT function of the home gateway 2, the gateway determination unit 32 finds ADD#1 in a source address field of the request message. In step S503, the gateway determination unit 32 checks whether the storage unit 31 contains the same address as the source address of the request message. If the storage unit 31 has, the gateway determination unit 32 reads out the identifier and access information associated with the source address from the storage unit 31. Since the address ADD#1 is stored in the storage unit 31, the gateway determination unit 32 reads out access information of the home gateway 2 and GUID#1 as shown in FIG. 5. If there is no address matching to the source address in the storage unit 31, the gateway determination unit 32 simply discards the request message or may send a message indicating a negative response to the device having the source address.

If the gateway determination unit 32 reads out the identifier and access information from the storage unit 31, the token generating unit 33 generates a token in step 504. It is possible to use an arbitrary method to generate a token, unless the same token is generated for a period that is sufficient to complete the sequence in FIG. 5.

In step S505, the processing unit 36 of the registration server 3 sends a response message including the token generated at the token generating unit 33 and access information of the home gateway 2. Upon receiving the response message from the registration server 3, the terminal device 1 extracts the access information from the response message, and sends a message including the token using the access information. In this embodiment, the terminal device 1 accesses the home gateway 2 and provides the token with the home gateway 2.

In step S507, the processing unit 24 of the home gateway 2 sends a message including the token on the connection to the connectivity server 5. In step S508, the connectivity server 5 sends the token to the registration sever 3. In the message from the home gateway 2, the identifier of the home gateway 2 is not included. However, the message is sent on the connection between the home gateway 2 and the connectivity server 5. Since the connection is established after authentication of the home gateway 2 by the connectivity server 5 using the identifier GUID#1 and the secret value SECRET#1 of the home gateway 2, the connectivity server 5 can determine the identifier associated with the token, i.e. GUID#1.

Thus, in step S508, the registration server 3 obtains the token and the identifier GUID#1 from the connectivity server 5. In some embodiments, the connectivity server 5 sends the token to the registration server 3, and the registration server 3 accesses to the connectivity server 5 to retrieve the identifier of the home gateway that sends the token. In some embodiments, the connectivity server 5 just sends the token and the identifier to the registration server 3.

In step S509, the processing unit 36 of the registration server 3 verifies whether or not the token and the identifier obtained from the connectivity server 5 are the same as that generated in step S504 and read out in step S503. If they are the same, the processing unit 36 of the registration server 3 determines that the authentication succeeded, and sends a message indicating a positive response to inform the connectivity server 5 of the success of authentication in step S510. The connectivity server 5 transfers the message to the home gateway 2. It should be noted that the processing unit 36 of the registration server 3 may send the message indicating a positive response to the home gateway 2 directly. In contrast, if the token and the identifier are not the same in step S509, the processing unit 36 of the registration server 3 simply discards the token and the identifier or sends a message indicating a negative response to the connectivity server 5 or the home gateway 2.

Upon receiving the message indicating a positive response from the registration server 3 in response to sending the token, the processing unit 24 of the home gateway 2 sends the identifier and the secret value of the home gateway 2, i.e. GUID#1 and SECRET#1 in this embodiment, to the terminal device 1 in step S512. The terminal device 1 stores the identifier and the secret value. With the sequence described above, the terminal device 1 obtains the identifier and the secret value, and can establish a connection with the connectivity server 5. Since the terminal device 1, home gateway 2 and the home network 6 are deployed in the same home and protected from unauthorized access, transmission of the identifier and the secret value on the home network 6 is safe from unauthorized interception.

In steps S507 and S508 of FIG. 5, the home gateway 2 sends the token to the registration server 3 via the connectivity server 5. However, the home gateway 2 may send the token and the identifier to the registration server 3 directly.

With the sequence in FIG. 5, the terminal device 1 obtains the same identifier and secret value as the home gateway 2. However, it may be necessary to use a different identifier and secret value for each device, and this is possible with the sequence depicted in FIG. 6.

Figure 6:
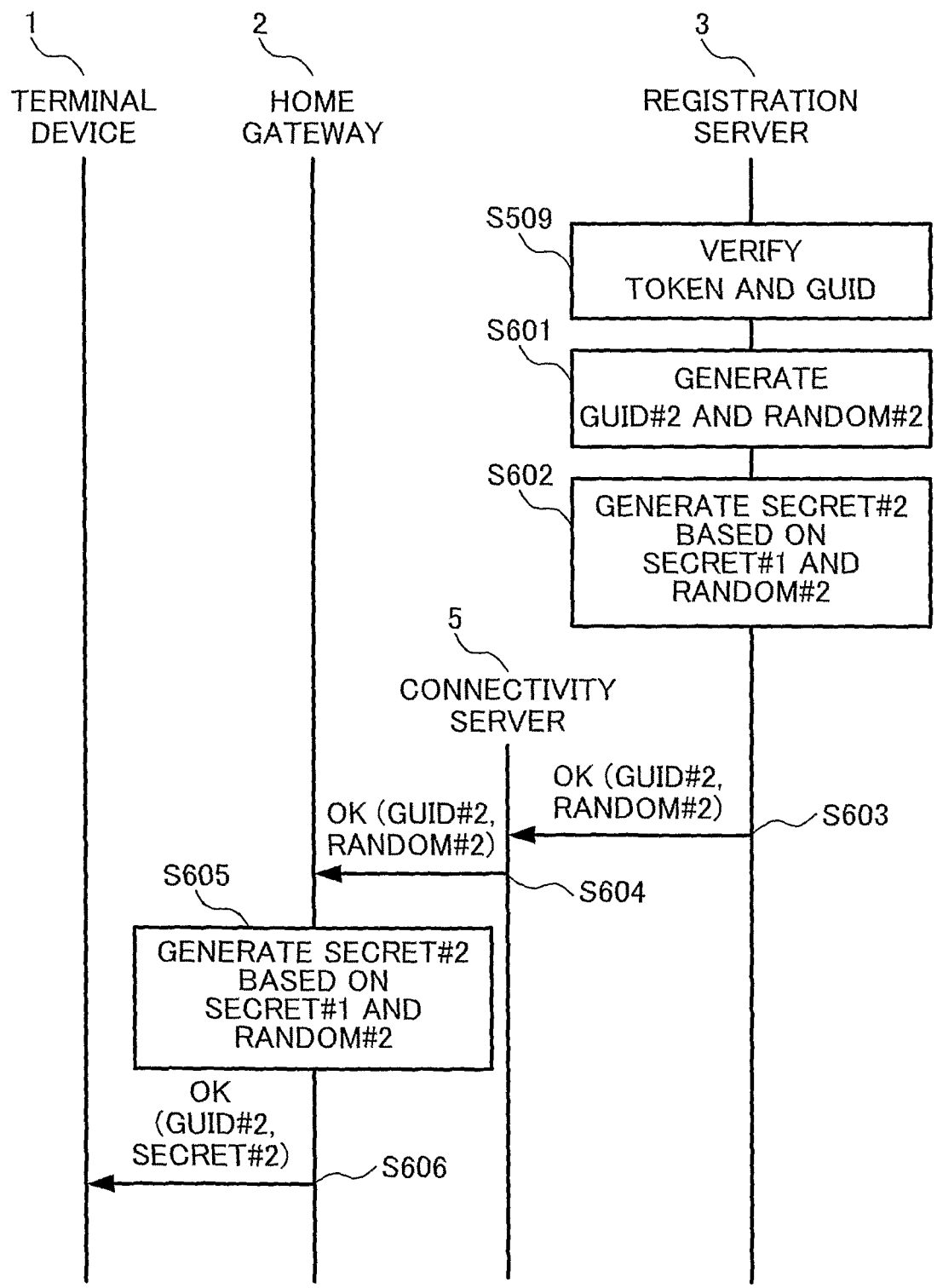
FIG. 6 is another sequence diagram for providing an identifier and a secret value with the terminal device.
Figure 7:
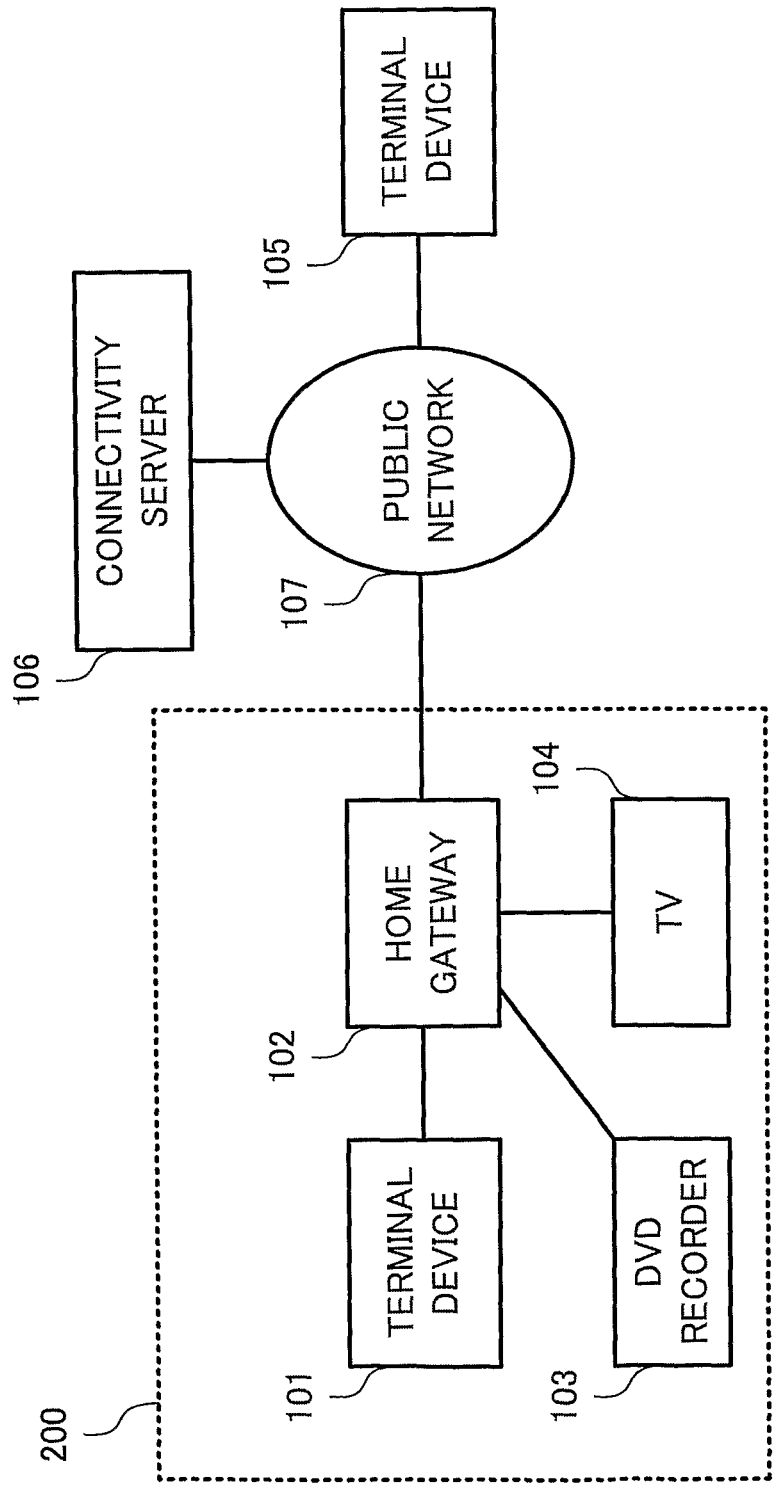
FIG. 7 shows a system including a connectivity server.

Since steps S501 to S509 are the same as that in FIG. 5, steps S501 to S508 are not shown in FIG. 6 for simplification.

If the authentication is successful in step S509, the identifier generating unit 34 and the random value generating unit 35 of registration server 3 generate an identifier and a random value, respectively in step S601. In FIG. 6, the identifier generating unit 34 generates GUID#2 as the identifier, and the random value generating unit 35 generates RANDOM#2 as the random value. In step S602, the processing unit 36 of the registration server 3 generates a secret value for the terminal device 1 based on the secret value of the home gateway 2, i.e. SECRET#1, and the random value RANDOM#2. In FIG. 6, the processing unit 36 generates SECRET#2.

In step S603, the processing unit 36 sends the identifier and the random value generated in step S601 to the connectivity server 5. The connectivity server 5 transfers them to the home gateway 2. It is noted that the processing unit 36 of the registration server 3 may sends the identifier and the random value to the home gateway 2 directly.

Upon receiving the identifier and the random value in response to sending the token, the processing unit 24 of the home gateway 2 generates the secret value SECRET#2 based on the secret value of the home gateway 2, i.e. SECRET#1, and the random value RANDOM#2 from the registration server 3 in step S605. Then, the processing unit 24 sends the identifier GUID#2 and the secret value SECRET#2 to the terminal device 1 in step S606, and the terminal device 1 stores the GUID#2 and SECRET#2. Further, the registration server 3 sends GUID#2 and SECRET#2 to the connectivity server 5 using a secure communication technique, which is not shown in FIG. 6.

With the sequence above, the terminal device 1 can obtain the dedicated identifier and secret value.

Many modifications and variations will be apparent to those of ordinary skilled in the art. The present embodiments were chosen and described in order to best explain the principles of the invention. It should be understood that the present invention is not limited to the specific embodiments described in the specification, except as defined in the appended claims.

For example, it is possible to implement the registration sever 3 and the connectivity server 5 on the same apparatus or computer. In some embodiments, the registration server 3 may be a client device of the connectivity server 5, and messages between the registration server 3 and the connectivity server 5 may be exchanged on a connection of the connectivity service.

Further, the invention may be achieved by a program, which realizes the functions of the above embodiments. Programs defining functions on the invention can be delivered to a computer system using non-statutory computer-readable storage media or via a network. It should be understood the invention may be implemented by software, hardware or a combination of software and hardware.

The invention claimed is:

1. A registration server, comprising:
a memory configured to store access information and an identifier for a gateway apparatus; and
a processor coupled to the memory, the processor being configured to:
determine a first gateway apparatus transferring a request signal from a device upon receipt of the request signal;
generate a token;
transmit a first signal including the token and first access information of the first gateway apparatus to the device if a first identifier of the first gateway apparatus is stored in the memory, the first access information being used by the device to send the token to the first gateway apparatus; and
transmit a second signal, which causes the first gateway apparatus to send authentication data to the device, to the first gateway apparatus when it obtains the token and the first identifier based on a third signal received in response to the first signal.

2. The registration server according to claim 1, wherein a first random value is generated and included in the second signal.

3. The registration server according to claim 2, wherein the memory stores a first secret value for the first gateway apparatus, and the processor generates a second secret value as the authentication data for the device based on the first secret value and the first random value.

4. The registration server according to claim 3, wherein the first identifier is generated during authentication between the first gateway apparatus and the registration server,
the first secret value is generated based on a second random value and a key shared with the first gateway apparatus during the authentication, and
the first access information and an address of the first gateway apparatus are obtained from the first gateway apparatus and stored in the memory during the authentication.

5. The registration server according to claim 1, wherein the processor determines the first gateway apparatus based on a source address of the request signal.

6. The registration server according to claim 1, wherein the token and the first identifier are included in the third signal.

7. The registration server according to claim 1, wherein the processor accesses a connectivity server having a connection with the gateway apparatus to obtain the first identifier upon receiving the third signal including the token.

8. A gateway apparatus, comprising:
a first interface for connecting to a first network;
a second interface for connecting to a second network;
a memory configured to store a first secret value as authentication data for the gateway apparatus,
wherein the first secret value is generated based on a value from a registration server connected to the first network and a key shared between the gateway apparatus and the registration server during an authentication between the gateway apparatus and the registration server; and
a processor coupled to the memory, the processor being configured to:
transfer a signal between the first network and the second network;
convert a source address of the signal transferred from the second network to the first network to an address assigned to the first interface;
transmit a first signal including a token to the registration server connected to the first network when it receives the token from a device connected to the second network; and
send a second secret value as authentication data for the device generated based on the first secret value to the device when it receives a second signal indicating a positive response from the registration server in response to the first signal.

9. The gateway apparatus according to claim 8, wherein the second secret value is the same as the first secret value.

10. The gateway apparatus according to claim 8, wherein the second secret value is generated based on the first secret value and a random value included in the second signal.

11. The gateway apparatus according to claim 8, wherein the gateway apparatus maintains a connection with a connectivity server, and
the first signal is transmitted to the registration server via the connectivity server using the connection.

12. The gateway apparatus according to claim 8, wherein access information to the gateway apparatus is sent to the registration server in the authentication.

13. A method for providing a device with authentication data, comprising the steps of:

generating, at a registration server, a token upon receipt of a request signal from the device via a gateway apparatus if the registration server has an identifier of the gateway apparatus;

sending, from the registration server, a first signal including the token and access information of the gateway apparatus to the device, the first access information being used by the device to send the token to the first gateway apparatus;

sending, from the registration server, a positive response signal to the gateway apparatus if the registration server obtains the token and the identifier in response to the first signal; and sending, from the gateway apparatus, the secret value as the authentication data for the device generated from another secret value assigned for the gateway apparatus to the device when it receives the positive response signal.

14. A computer program stored in a non-transitory computer readable medium, the computer program for causing a computer to:

store access information and an identifier for one or more gateway apparatus;

determine a first gateway apparatus transferring a request signal from a device upon receiving the request signal;

generate a token;

transmit a first signal including the token and first access information of the first gateway apparatus to the device if a first identifier of the first gateway apparatus is stored in the computer, the first access information being used by the device to send the token to the first gateway apparatus; and transmit a second signal, which causes the first gateway apparatus to send authentication data to the device, to the first gateway apparatus when it obtains the token and the first identifier based on a third signal received in response to the first signal.

15. A computer program stored in a non-transitory computer readable medium, the computer program for causing a computer to:

store a first secret value as authentication data for a gateway apparatus, wherein the first secret value is generated based on a value from a registration server connected to a first network and a key shared between the gateway apparatus and the registration server during an authentication between the gateway apparatus and the registration server;

transfer a signal between a first interface for connecting the first network and a second interface for connecting a second network;

convert a source address of the signal transferred from the second network to the first network to an address assigned to the first interface;

transmit a first signal including a token to the registration server connected to the first network when it receives the token from a device connected to the second network; and send a second secret value as authentication data for the device generated based on the first secret value to the device when it receives a second signal indicating a positive response from the registration server in response to the first signal.

* * * * *